Figure 1:
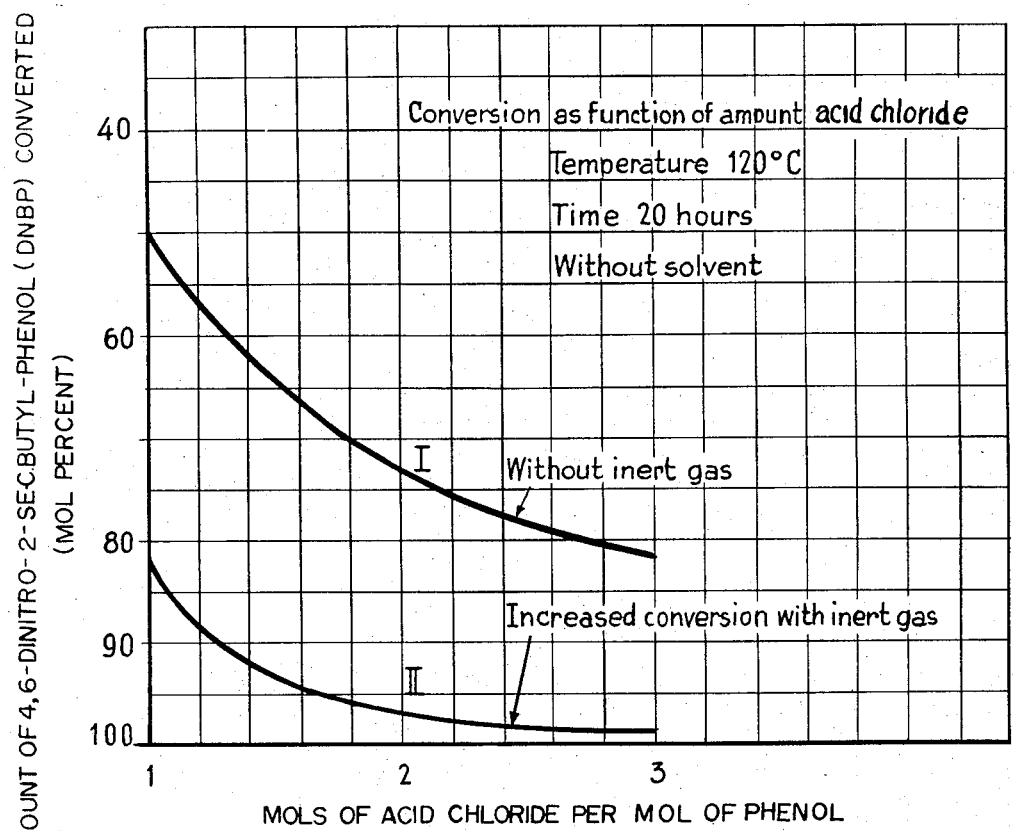

United States Patent Office 3,370,085
Patented Feb. 20, 1968

3,370,085
PROCESS FOR THE MANUFACTURE OF
DINITROALKYLPHENOL ESTERS
Otto Scherer, Bad Soden, Taunus, Karl Reichner, Frankfurt am Main, and Hans Habicht, Kelkheim, Taunus, Germany, assignors to Farbwerke Hoechst Aktiengesellschaft vormals Meister Lucius & Bruning, Frankfurt am Main, Germany, a corporation of Germany
Filed Apr. 9, 1963, Ser. No. 271,630
Claims priority, application Germany, Apr. 11, 1962,
F 36,522
13 Claims. (Cl. 260—476)

The present invention relates to a process for the manufacture of dinitroalkylphenol esters.

The esterification of so strongly negatively substituted phenols as dinitroalkylphenols or dinitro-cycloalkyl-phenols, for example 4,6 - dinitro - 2 - alkyl - phenols, 2,6-dinitro - 4 - alkyl - phenols, - 4,6 - dinitro - 2 - cycloalkyl-phenols, 2,6 - dinitro - 4 - cycloalkyl - phenols and 4,6-dinitro - 4 - alkyl - phenols, 4,6 - dinitro - 2 - cycloalkyl-ing to the usual esterification methods such as azeotropic dehydration or the Schotten-Baumann method. In other words, all processes fail in which water is present or formed during the esterification.

A method such as reaction with acid anhydrides can be used only in special cases in view of the upper temperature limit beyond which there is a danger that the esters formed will decompose. The method of Spassow (Berichte der Deutschen Chemischen Gesellschaft, vol. 70, page 1926 and vol. 75, pages 779–784) enables the said esters to be prepared in the laboratory in rather satisfactory yields. On a technical scale, however, this method involves some hazards due to unforeseen reduction reactions from the presence of metallic magnesium and occasional small amounts of water.

The reaction of carboxylic acid chlorides with these strongly acid phenols in the presence or absence of an inert solvent is either very incomplete or requires, in most cases, boiling periods of from 50 to 70 hours to lead to reasonable yields.

Of the known methods, the method of A. Einhorn and F. Hollandt (Liebig's Annalen, vol. 301, page 95 (1898)) according to which tertiary amines are concomitantly used has proved to be the most suitable one. According to said method, a carboxylic acid chloride is reacted rather extensively with dinitroalkylphenol in an inert solvent by the addition of a tertiary amine. In the interest of economy, the tertiary amine must be recovered, which requires rather great expenditure of apparatus. Said method also requires that first the carboxylic acid chloride be produced.

Now we have found that dinitroalkylphenol esters and dinitrocycloalkylphenol esters can be obtained in a simple manner in good yields by accelerating the ester formation by conducting gases that are inert under the reaction conditions, advantageously nitrogen, through the reaction mixture of dinitroalkylphenol or dinitro-cycloalkyl-phenol and carboxylic acid halide in the presence or absence of an inert diluent or in the presence of an excess of carboxylic acid halide, advantageously carboxylic acid chloride, at temperatures within the range of 75° C. to 145° C., advantageously 110° C. to 135° C., and/or by adding substances having a catalytic action, for example phosphorus trihalide, phosphorus pentahalide, phosphorus oxyhalide, phosphorus acid or anhydrous magnesium chloride, advantageously phosphorus trichloride, to the mixture of dinitroalkylphenol or dinitro-cycloalkyl-phenol and carboxylic acid halide, if desired in the presence of an inert solvent.

It is advantageous to form the carboxylic acid halide, preferably carboxylic acid chloride, intermediately in the reaction medium by causing an excess of phosphorus trihalide to act on the mixture of free carboxylic acid and dinitroalkylphenol or dinitro-cycloalkyl-phenol in an inert organic solvent, then to remove the major portion of the phosphorous acid which has separated and to terminate the ester formation by boiling under reflux at temperatures within the range of 75° C. to 145° C., advantageously 110° C. to 135° C.

Exemplary of phenolic compounds to be used in the process of the invention are 4,6-dinitro-2-sec.butyl-phenol
2,6-dinitro-4-sec.butyl-phenol
4,6-dinitro-2,3-dimethyl-phenol
2,6-dinitro-4-cyclohexyl-phenol
4,6-dinitro-2-cyclohexyl-phenol.

Exemplary of carboxylic acid halides to be used in the process of the invention are $\beta,\beta$-dimethyl-acrylic acid chloride
n-caproic acid chloride
crotonic acid chloride
isobutyric acid chloride
benzoic acid chloride
2,4-dichlorobenzoic acid chloride
pentene-(3)-carboxylic acid chloride.

It is advantageous, first to prepare the acid chloride from the free carboxylic acid and an excess of phosphorus trichloride and then to cause the reaction solution to act on the dinitro-alkyl-phenol or dinitro-cycloalkyl-phenol after the major part of the phosphorous acid formed has been removed.

A number of other catalysts such as $SbCl_3$, $ZnCl_2$, $SnCl_4$, $AlCl_3$, $FeCl_3$ and $HgCl_2$ are less suitable for carrying out the reaction of the invention on a large scale since these catalysts are insufficiently effective or cause the reactants to decompose.

Some of the catalysts suitable for use in the process of the invention make it unnecessary to prepare the carboxylic acid halide separately, since when free carboxylic acid and, for example, an excess of phosphorus trichloride are used, carboxylic acid chloride is intermediately formed besides phosphorous acid. After the latter has been substantially removed a mixture is obtained which, in combination with the dinitrophenol in the presence or absence of an inert diluent, rapidly completes the reaction on boiling or treating with inert gas.

Very slight amounts of catalyst, for example 0.02 mol percent calculated on the dinitroalkylphenols or dinitrocyclolaalkyl-phenol, already have a pronounced catalytic effect. In general, an amount within the range of 0.2 mol percent to 10 mol percent of catalyst, advantageously 1 to 4 mol percent of catalyst, is used for each mol of dinitroalkylphenol or dinitro-cycloalkyl-phenol, as is the case, for example, when in the formation of the acid chloride by means of phosphorus trichloride, in the presence or absence of a solvent, the catalyst is used in an excess necessary for quantitatively converting the free carboxylic acid into the carboxylic acid chloride. Larger additions are generally harmless. They do not have, however, an appreciably improved effect.

When inert gas is passed through the reaction mixture, only a fraction of the small amounts of dissolved hydrogen chloride (about 2 to 4 mol percent) remains behind which favourably influences the course of the reaction. When, for example, dinitro-sec.butyl-phenol and $\beta,\beta$-dimethyl-acrylic acid chloride are esterified in batches containing these reaction components in a molar ratio, without using an inert gas, 50% of the dinitro-sec.butyl-phenol is not reacted and even with an excess amount of 200% (3 mols) of acid chloride the reaction stops at an extent of conversion of 82%, i.e. 18% is not reacted. When inert gas is used, the amount of unreacted phenol is only 15%, instead of 50% in the first case and only 0.6%, instead of 18%, in the second case.

Measurements of the hydrogen chloride dissolved in reactions carried out with or without an inert gas clearly show the inhibiting effect of small amounts of HCl. The inert gas reduces the amount of dissolved HCl to, for example, 1/10 of the original amount, for example from 3% to 0.3%. Gases which are inert under the reaction conditions, therefore, enable reactions to be completed which, without inert gas, would stop at technically entirely unsatisfactory yields.

Even the use of 0.05 liter of inert gas per hour and per mol of dinitro alkylphenol or dinitro-cycloalkyl-phenol has a pronounced effect. Advantageously, 2.5 to 25 liters, preferably 5 to 10 liters, of inert gas are used per hour and per mol of dinitroalkylphenol or dinitro-cycloalkyl-phenol. With adequate cooling, larger amounts may be used. For example, after reacting for 7 hours, without using nitrogen, the content of unreacted dinitroalkylphenol or dinitrocycloalkyl-phenol amounts to 44%. Using, respectively, 2.5, 5, and 25 liters of nitrogen per hour and per mol, the amounts of unreacted phenol are 31%, 28%, and 5%.

As solvents, aliphatic and aromatic hydrocarbons and chlorinated hydrocarbons may be used, for example trichlorethane, carbon tetrachloride, benzene, toluene, xylene and chlorobenzene.

Figure 2:
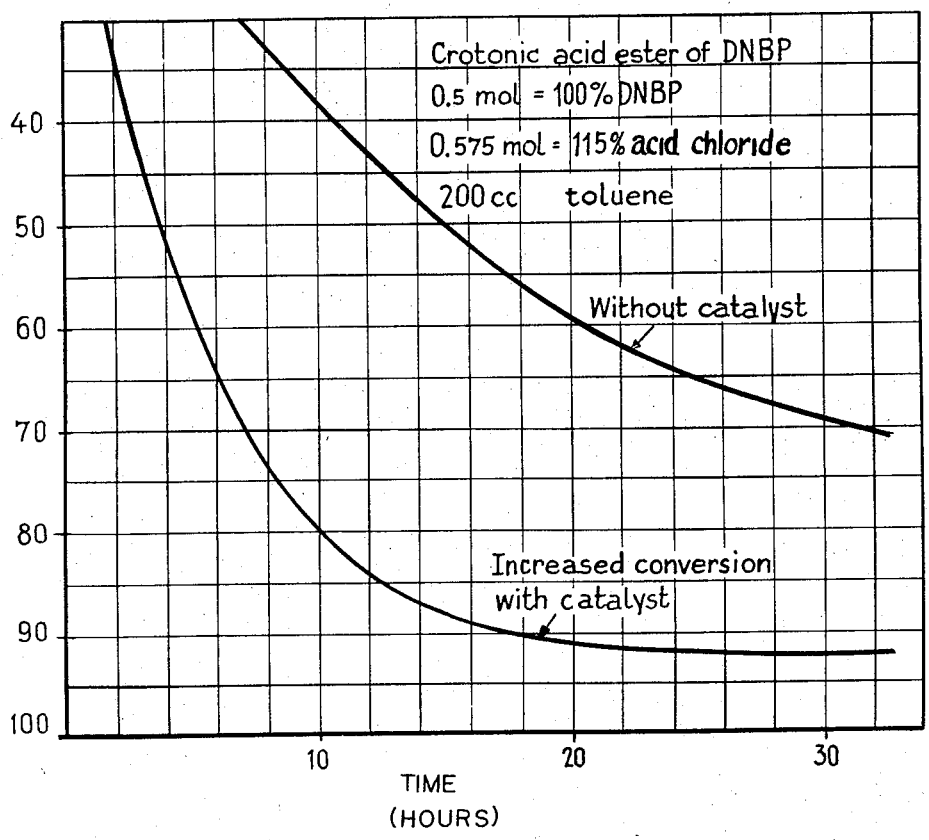

In the accompanying drawings, FIG. 1 is a graph showing the mol percent of 4,6-dinitro-2-sec. butyl phenol (DNBP) reacted with an acid chloride after 20 hours as a function of the mol ratio of acid chloride to phenol, both in the presence and absence of inert gas, FIG. 2 is a graph showing the mol percent of DNBP reacted with crotonic acid as a function of time at a fixed mol ratio of acid chloride to phenol of 1.15:1. The following table shows the effects of $PCl_3$ and of inert gas on ester formation reactions at a sump temperature of 120° C.

TABLE

| Starting materials | Percent unreacted dinitroalkylphenol after— | | |
|---|---|---|---|
| | 6 hours | 12 hours | 18 hours |
| 4,6-dinitro-2-sec. butyl-phenol, crotonic acid chloride: | | | |
| With $PCl_3$ | 35 | 16 | 10 |
| Without $PCl_3$ | 78 | 57 | 44 |
| 4,6-dinitro-2-sec. butyl-phenol, n-caproic acid chloride: | | | |
| With $PCl_3$ | 30 | 13 | 10 |
| Without $PCl_3$ | 67 | 46.5 | 33.5 |
| 4,6-dinitro-2,3-dimethyl-phenol, β,β-dimethyl-acrylic acid chloride: | | | |
| With $PCl_3$ | 6 | 3 | |
| Without $PCl_3$ | 37 | 22 | |
| 4,6-dinitro-2-sec. butyl-phenol, 1 mol; β,β-dimethyl-acrylic acid chloride, 1.2 mols: | | | |
| With inert gas | 17.5 | 11 | 10 |
| Without inert gas | 50 | 50 | 50 |
| 4,6-dinitro-2-sec. butyl-phenol, 1 mol; -β,β-dimethyl-acrylic acid chloride, 3 mols: | | | |
| With inert gas | 7 | 2.5 | 1 |
| Without inert gas | 20 | 18 | 18 |

The esters obtained by the process of the invention can be used as plant protectives, for example as acaricides, fungicides, ovicides and herbicides. Depending on their intended use, they may be used in the crude or purified state.

The following examples serve to illustrate the invention but they are not intended to limit it thereto.

*Example 1*

120 grams 4,6-dinitro-2-sec.butyl-phenol (0.5 mol) were heated to 135° C. with 178 grams β,β-dimethyl-acrylic acid chloride (1.5 mols) and a gas stream of about 3 liters per hour of nitrogen was passed through the reaction mixture.

After the reaction mixture had been treated in this manner for 10 hours, the extent of conversion amounted to 99.4 mol percent. The acid chloride in excess was distilled off in vacuo and the oil remaining behind solidified at room temperature.

Depending on the intended use, the oil could be used as crude product in one instance and was purified by recrystallization in another instance.

When the reaction mixture was not treated with inert gas, the esterification which in the above case had terminated with a content of free phenol of 0.6 mol percent, stopped at a content of free phenol of 18 mol percent.

The above method of working could also be carried out continuously.

*Example 2*

120 grams 4,6-dinitro-2-sec.butyl-phenol (0.5 mol) and 72 grams β,β-dimethyl-acrylic acid chloride (0.6 mol) were heated to a sump temperature of 120° C. Simultaneously, about 3 liters per hour of nitrogen were passed through the reaction mixture.

After 10 hours the extent of conversion amounted to 90 mol percent whereas it amounted only to 50 mol percent when no inert gas was used.

*Example 3*

240 grams 4,6-dinitro-2-sec.butyl-phenol (1 mol) and 115 grams β,β-dimethyl-acrylic acid (1.15 mols) were dissolved in 400 cc. dry toluene. Into the solution so obtained, 60 grams phosphorus trichloride were stirred at a temperature within the range of 20 to 30° C. and the whole was allowed to stand for 8 hours. After that time the separation of phosphorous acid which had taken place without liberation of heat, was terminated. The reaction mixture was decanted in one instance while in another instance the phosphorous acid was discharged and the reaction mixture was then boiled under vigorous reflux for about 12 hours.

The toluene was distilled off in vacuo, whereby unreacted acid chloride also passed over. The distillate was used again for a further batch.

The oily brown residue which solidified in the cold contained above 95 mol percent of desired ester.

The ester could easily be obtained in pure form by recrystallization from methanol in one case and from ethanol in another case. The ester melted at 68° C. It constituted a white, slightly yellowish crystal powder of slightly aromatic odor.

After removal of the solvent, a residue was obtained from the mother liquor, which residue was reacted as described above to obtain further quantities of ester.

*Example 4*

120 grams 4,6-dinitro-2-sec.butyl-phenol (0.5 mol) and 69 grams β,β-dimethyl-acrylic acid chloride were heated in 200 cc. chlorobenzene to a sump temperature of 120° C., while passing 3 liters per hour of nitrogen through the solution. After 30 hours, the extent of conversion amounted to 86 mol percent.

Without inert gas, an extent of conversion of 43 mol percent was obtained after the same period of time.

*Example 5*

120 grams 4,6-dinitro-2-sec.butyl-phenol (0.5 mol) and 202 grams n-caproic acid chloride (1.5 mols) were heated to 125° C., while condensing under reflux and passing about 3 liters per hour of inert gas through the reaction mixture.

After 20 hours, the extent of conversion amounted to 99 mol percent.

After distilling off the excess of acid chloride, the high-percent oil could be used directly for various purposes.

*Example 6*

By proceeding as described in Examples 3 but using 133 grams n-caproic acid (1.15 mols), instead of 115 grams β,β-dimethylacrylic acid, an extent of conversion of above 95 mol percent was obtained.

To purify the ester so that it could be used for special purposes, its solution in toluene was washed with dilute aqueous soda solution to remove all acid constituents such as free carboxylic acid, free dinitroalkylphenol and phosphorous acid. The solution in toluene was then dried with anhydrous salts, the toluene was distilled off and the oily ester was obtained in the form of a yellow-brownish oil. The yield was above 80%.

*Example 7*

120 grams 4,6-dinitro-2-sec.butyl-phenol (0.5 mol) were heated with 127 grams crotonic acid (1.5 mols) to a temperature of 125° C., while passing 3 parts by volume per hour of inert gas through the reaction mixture. After 25 hours, the extent of conversion amounted to above 99 mol percent. The excess of acid chloride was removed in vacuo in a film evaporator. The ester was oily.

*Example 8*

120 grams 4,6-dinitro-2-sec.butyl-phenol (0.5 mol) were heated with 200 cc. chlorobenzene to a sump temperature of 135° C. In the course of 6 hours, a mixture of 80 grams isobutyric acid chloride (0.75 mol) and 2 grams phosphorus trichloride was added drop by drop. After reacting for a further 30 hours, while passing 3 liters per hour of nitrogen through the reaction mixture, the extent of conversion amounted to above 98 mol percent. The solvent was distilled off in vacuo with the excess of acid chloride. The oily ester was used without further purification.

*Example 9*

106 grams 4,6-dinitro-2,3-dimethylphenol (0.5 mol) were heated with 178 grams β,β-dimethyl-acrylic acid chloride (1.5 mols) to a sump temperature of 125° C., while passing 3 liters per hour of inert gas through the reaction mixture. After 12 hours, the extent of conversion amounted to 99.7 mol percent.

The excess of acid chloride was distilled off in vacuo. The residue remaining behind solidified completely. It was used in one instance as crude product and in another instance after recrystallization from methanol. Light yellow crystals melting at 87 to 88° C. were obtained.

The above method of working could also be carried out continuously.

*Example 10*

58 grams β,β-dimethyl-acrylic acid (0.575 mol) were dissolved in 200 cc. toluene and 30 grams phosphorus trichloride were then added. After 5 hours, the phosphorous acid (16 grams) which had separated was discharged and the solution was heated with 106 grams 4,6-dinitro-2,3-dimethyl-phenol (0.5 mol) to a sump temperature of 120° C. After 12 hours, the extent of conversion amounted to 97 mol percent. After the toluene had been distilled off, the substance solidified.

Whereas 3 mol percent free dinitroalkylphenol was still present in this case, in an analogous process carried out with pure acid chloride without phosphorus trichloride 22 mol percent free dinitroalkylphenol was still present after 12 hours.

*Example 11*

270 grams 4,6-dinitro-2-cyclohexyl-phenol (1.01 mols) were heated with 500 cc. xylene to 140° C. In the course of 5 hours, a mixture of 160 grams pentene-(3)-carboxylic acid chloride (1.18 mols) and 10 grams phosphorus oxychloride was added drop by drop. After reacting for 20 hours, while passing 8 liters per hour of nitrogen through the reaction mixture, the extent of conversion amounted to 97 mol percent.

The excess of acid chloride and the solvent were distilled off in vacuo. The ester remaining behind solidified on cooling and was purified by washing with a small amount of cold methanol. The ester was obtained in the form of yellow-brown crystals melting at 68 to 69° C.

We claim:

1. The method for esterifying a 2,6-dinitro- or 4,6-dinitro-alkylphenol or -cycloalkylphenol which comprises passing an inert gas through a mixture of the dinitrophenol and an unsubstituted or chlorosubstituted aliphatic or benzene carboxylic acid halide at a temperature from 75° C. to 145° C.

2. The method as in claim 1 wherein a catalyst selected from the group consisting of phosphorus trihalides, phosphorus pentahalides, phosphorus oxyhalides and phosphorous acid is additional present.

3. The method as in claim 2 wherein from 0.2 to 10 mol percent of catalyst is used per mol of dinitrophenol.

4. The method as in claim 2 wherein said dinitrophenol and carboxylic acid halide are in an inert diluent.

5. The process as in claim 4 wherein said diluent is a member selected from the group consisting of trichlorethane, carbon tetrachloride, benzene, toluene, xylene, and chlorobenzene.

6. The method as in claim 2 wherein said inert gas is nitrogen.

7. The method as in claim 2 wherein from 2.5 to 25 liters of inert gas are used per hour and per mol of dinitrophenol.

8. The method as in claim 2 wherein an excess of carboxylic acid halide is used.

9. The method as in claim 2 wherein said carboxylic acid halide is a carboxylic acid chloride.

10. The method as in claim 2 wherein said dinitrophenol is at least one member selected from the group consisting of 4,6-dinitro-2-sec. butyl-phenol; 2,6-dinitro-4-sec. butyl-phenol; 4,6-dinitro-2,3-dimethyl - phenol; 2,6-dinitro-4-cyclohexyl-phenol; and 4,6-dinitro-2-cyclohexyl-phenol.

11. The method as in claim 2 wherein said carboxylic acid halide is a member selected from the group consisting of β,β-dimethyl-acrylic acid chloride, n-caproic acid chloride, crotonic acid chloride, isobutyric acid chloride, benzoic acid chloride, and pentene-3-carboxylic acid chloride.

12. The method as in claim 2 wherein said carboxylic acid chloride is formed prior to reaction with said dinitrophenol by reacting an excess of phosphorus trichloride with the corresponding carboxylic acid and removing a major part of the phosphorous acid so formed.

13. The method for esterifying a 2,6-dinitro- or 4,6-dinitro-alkylphenol or -cycloalkylphenol which comprises reacting the dinitrophenol and an unsubstituted or chlorosubstituted aliphatic or benzene carboxylic acid halide at a temperature from 75° C. to 145° C. in the presence of a catalyst selected from the group consisting of phosphorus trihalides,, phosphorus pentahalides, phosphorus oxyhalides, and phosphorous acid.

References Cited

UNITED STATES PATENTS 2,861,915  11/1958  Cary _____ 260—479

LORRAINE A. WEINBERGER, *Primary Examiner.*

RICHARD K. JACKSON, *Examiner.*

T. L. GALLOWAY, *Assistant Examiner.*